United States Patent [19]

Mischenko

[11] 4,018,521
[45] Apr. 19, 1977

[54] MIXED SLIDE SEPARATOR

[75] Inventor: Nicholas Mischenko, Mount Prospect, Ill.

[73] Assignee: Bell & Howell Company, Chicago, Ill.

[22] Filed: Jan. 26, 1976

[21] Appl. No.: 652,264

[52] U.S. Cl. .............................. 353/104; 40/78.07; 353/112; 353/DIG. 1
[51] Int. Cl.² .................. G03B 23/00; G03B 23/02
[58] Field of Search .................. 353/103–107, 353/DIG. 1, 111–117; 40/78.3, 78.7, 78.9

[56] References Cited

UNITED STATES PATENTS

| | | | |
|---|---|---|---|
| 3,656,846 | 4/1972 | Hipelius et al. | 353/104 |
| 3,773,413 | 11/1973 | Costanza et al. | 353/117 |

*Primary Examiner*—Richard E. Aegerter
*Assistant Examiner*—John W. Shepperd
*Attorney, Agent, or Firm*—John E. Peele, Jr.

[57] ABSTRACT

A slide projector having a supply station to accept slides from a vertical stack in a supply means, the projector having a slide separator device enabling single slide feed in a horizontal plane from an intermixed stack of thick and thin slides in the supply means.

1 Claim, 7 Drawing Figures

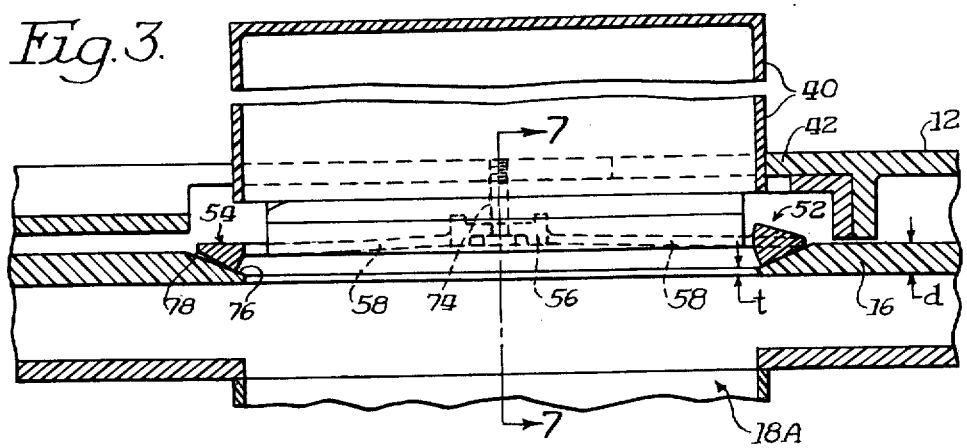
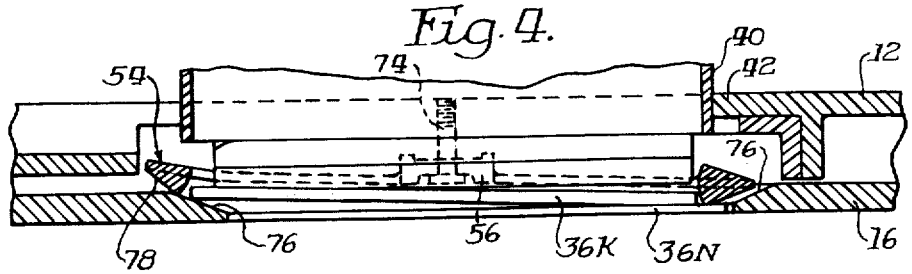
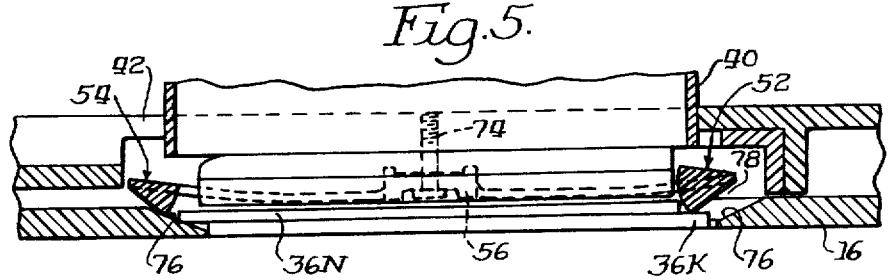
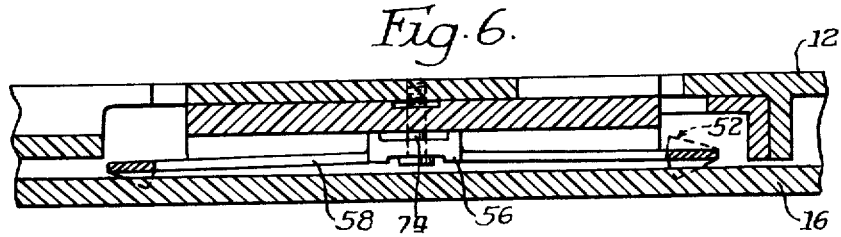
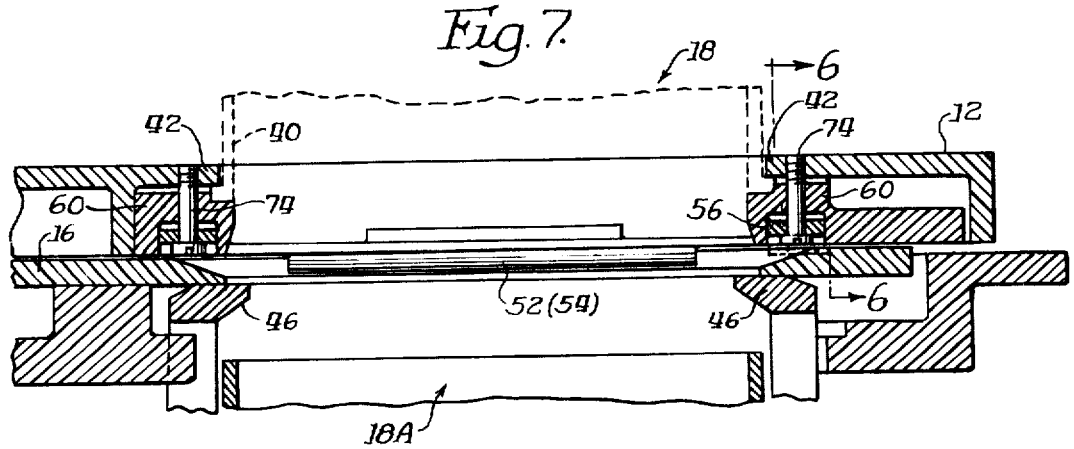

MIXED SLIDE SEPARATOR

This invention relates to a slide projector accepting slides from a vertical stack, and particularly to an improved slide separator device for moving intermixed thick and thin slides individually from the stack in a horizontal plane.

Slide projectors have been developed to accept slides from a supply cartridge. To feed the slides from the supply to the projection station of the projector, the slides are disposed in a vertical stack substantially horizontally over an opening in the housing of the projector. At the supply station, a slide release device releases slides individually for cycling by the slide transport mechanism of the projector from the supply station to the projection station. Following projection, the slides are cycled back to the supply cartridge.

Since the majority of slides are returned from processors in relatively thin plastic or cardboard mounts, projectors have been designed to separate one thin mount slide from an adjacent thin mount slide in the stack. To insure singular slide separation, the known projectors are provided with a mechanism that permits passage of only a single slide from the supply. If the mechanism is designed non-adjustably as a compromise to handle both thick and thin mounts, the transport may be jammed as it attempts to transport two thin slides or two such slides may be fed into the space for one thick slide, transported, and projected at the same time resulting in a double image.

In general, the image bearing material or film of a slide or transparency is supported in a mount for handling. Depending on the film processor, the mount may be of cardboard, metal, or plastic. Further, the film may be either unprotected or protected by thin pieces of glass or clear plastic. Several makes of cardboard or plastic mounts enclose the edges of an otherwise unprotected film resulting in a thin mount. In comparison, several makes of metal or plastic mount enclose the edges of a film and two pieces of glass or plastic to protect the film on both sides resulting in a substantially thicker mount.

Further, the slide mounts of different manufactures have different thicknesses. Consequently, it is desirable to construct a slide separating or metering device that will permit access to the projection station of only a single slide, regardless of thickness, within practical limitations. Because of the several slide thicknesses being used by the major manufacturers, a slide separating device must be readily adjustable to rather precise tolerances.

This invention presents a slide separating device useful in a slide projector of the class above-referenced, that is effective in separating a single slide from an intermixed supply of thick and thin slides. The device, when assembled in a projector, is self adjusting to handle the several thicknesses of slides, and remains in necessary adjustment during the anticipated large number of cycles of the projector. The separating device functions appropriately when slides are transported in both forward and reverse directions of travel. Although the slides are generally transported forwardly, the projector may be designed to allow a slide that has been transported from the supply station to be returned thereto while another slide is re-projected.

An object of the present invention is to provide for use in a slide projector a simple, trouble free slide separator for separating intermixed thick and thin slides.

Other objects and features of this invention will become more apparent from the description of the accompanying drawings in which like numerals refer to like parts.

IN THE DRAWINGS

FIG. 3 is a sectional view taken along line 3—3 in FIG. 1 with no slide present;

FIG. 4 is a sectional view as in FIG. 3 with a thin slide present;

FIG. 5 is a sectional view as in FIG. 3 with a thick and a thin slide present;

FIG. 6 is a sectional view taken along line 6—6 in FIG. 7; and

FIG. 7 is a sectional view taken along line 7—7 in FIG. 3.

Figure 1:
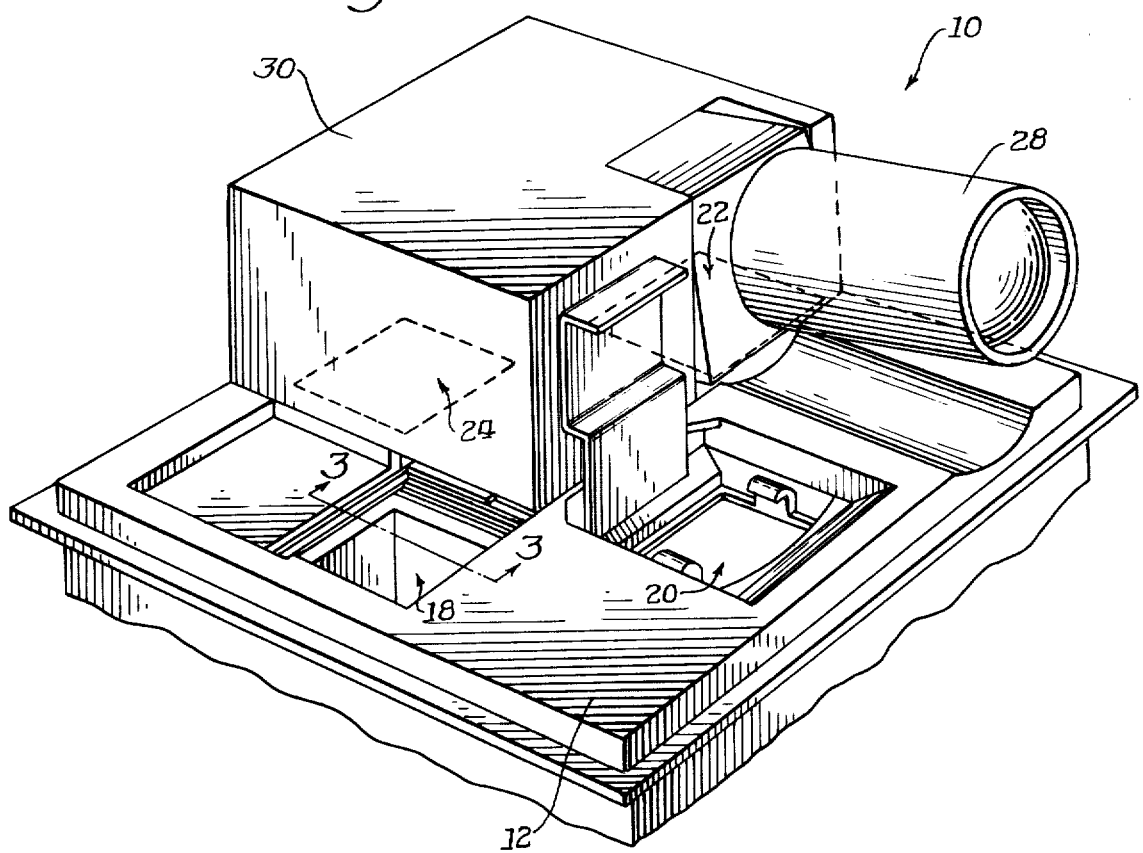
FIG. 1 is a perspective view of the upper portion of a slide projector incorporating the features of the present invention

Referring to FIG. 1, there is seen the upper portion of a slide projector, generally referred to at 10, and as described in more detail in U.S. Pat. No. 3,591,275. A plate 12 defines a top surface over a platen 16 of the projector, as shown in FIGS. 3–7. Four apertures 18, 20, 22 and 24 are formed in the platen 16, and correspond to the operative stations of the slide projector, respectively identified as: entry-exit; pre-viewing; projection; and post-projection. Associated with the projection station 22 is a projection lens 28 by which a slide is imaged onto a not shown remote viewing screen. The latter two stations, projection, and post projection, are covered by an upper housing portion 30. The entry-exit and pre-viewing stations are uncovered to permit a slide 36 to be introduced and removed, as desired, either directly or from a supply shown as cartridge 40, a portion of which is shown in FIGS. 3–7. Particularly, the pre-viewing station 20 permits the operator to view a slide prior to projection as more fully described in U.S. Pat. No. 3,591,275. (This patent and the others referenced herein are assigned to the assignee of this application). The post-projection station 24 permits the operator to determine which slide was last projected, by returning the slide at that station to the projection station 22, if desired.

A plurality of slides 36 to be projected are introduced to the slide projector in the slide supply or cartridge 40 described in more detail in U.S. Pat. No. 3,644,033. As seen in FIG. 7, the magazine is held on the projector by retaining members 42, positioned in the entry-exit station 18. To prevent a supply of slides placed in the station in the open bottom magazine from dropping through the exit entrance 18A at the station, a pair of releasably actuatable blockers 46 are positioned immediately below the platen 16. These blocker members and their function are described in more detail in U.S. Pat. No. 3,926,514.

Figure 2:
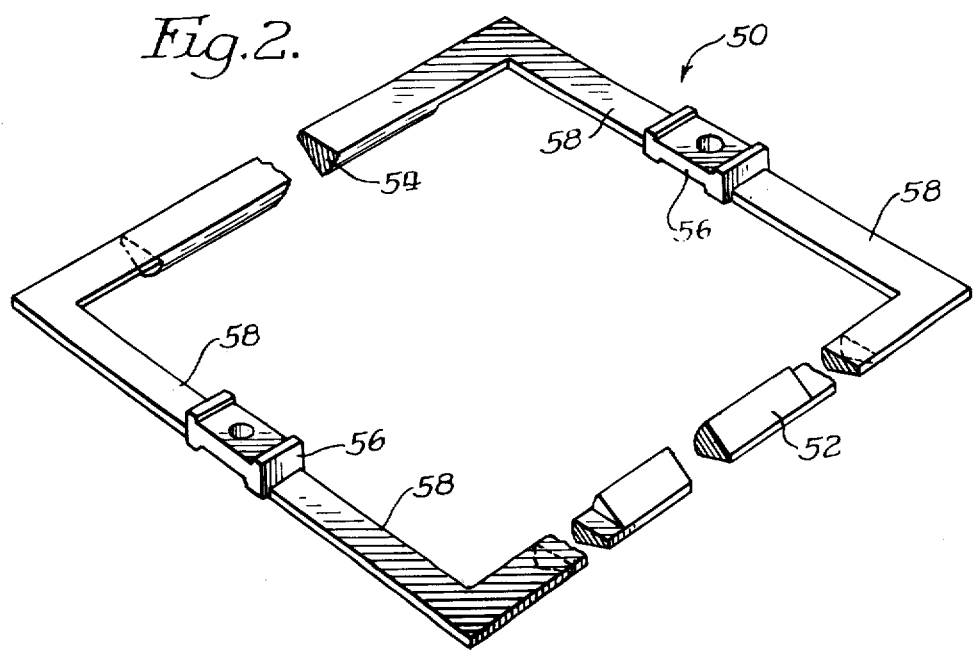
FIG. 2 is an enlarged detail of the separator device incorporated at the supply station of the slide projector in FIG. 1.

At the entry-exit station 18, in combination with the slide blocker members 46, a slide separator device 50 is assembled to separate slides 36 of different thicknesses. The thick (36K) and thin (36N) slides are supplied in the supply cartridge intermixed in any sequence desired by the projector operator. As seen in FIG. 2, the separator is a molded member of essentially square configuration. Stripper portions 52, 54 of the member are semi-rigid, being attached integrally to mounting portions 56 by yieldable arm portions 58. As seen in FIG. 7, the mounting portions enable attachment of the separator to side plates 60 in the entry-exit station by attaching means, such as headed screws 74. The stripper portions 52, 54 are arranged to extend across the front and rear portions of the station 18 to enable separation of slides during both forward and reverse slide transport. Referring to FIGS. 3–6, forward transport is caused when the platen 16 rotates to the right. The forward stripper portion 52 is of substantially triangular configuration in cross-section, while the rearward stripper portion 54 is of half triangular configuration in cross-section, as compared to the forward portion. The yieldable arms 48 are of rectangular cross-section and are biased downwardly to cause the stripper portions to continuously engage the platen in which the slides are positioned for transport from station to station.

As seen in FIG. 3, the separator member 50 rests on the platen with the stripper portions disposed in the aperture in which a slide is to be positioned for transport. The platen 16 has a predetermined thickness $d$ which is slightly greater than the thickest slide likely to be projected in the projector. Proximate the aperture, the platen is provided a tapered ledge 76, inclined toward the aperture to a thickness $t$ substantially corresponding to the thickness of the thinnest slide contemplated for use in the projector. The lower surface 78 of the stripper portions 52, 54 of the separator are formed at an angle substantially corresponding to the tapered ledge 76 of the platen. Thus, as the platen is rotated either in a forward or reverse direction, the respective opposite stripper portions 52, 54 are lifted to the top of the platen. Simultaneously, as the platen is rotated, the respective leading stripper portion rides at a minimum level under the biasing of the arms 58. Without a slide in the aperture, the leading stripper portion 52 continues to ride at the minimum level until the trailing platen ledge 76 engages the lower edge 78 of the stripper portion, and lifts the stripper to the top surface of the platen 16. Rotation of the platen continues until the aperture is positioned at the next station, and another aperture is positioned at this station. As rotation of the platen stops so that a slide 36 can be accepted by the aperture now at the station, the stripper portions of the separator are again seated against the tapered ledge portions 76 of the platen.

Assuming now that a relatively thin slide 36N is to be inserted into the aperture of the platen 16. The leading stripper portion 52 of the separator, in the direction of platen rotation shown in FIG. 4 as being to the right, rides down the tapered ledge 76 and onto the top of the slide 36N in the aperture. Whether the next slide 36 is thick or thin, that slide is retained between the stripper portions until another aperture of the platen is located at the station. That is, the relatively flat inner edge of the stripper portion engages the edge of the next slide, shown as 36K, to prevent that slide from moving as the platen rotates. Since the slide cannot move rotationally, the rear ledge of the platen lifts the trailing stripper portion of the separator and the adjacent edge of the slide to the top of the platen. The remainder of the slide and the forward stripper portion are eventually lifted as the platen is further rotated to ultimately position the thin slide in the aperture at the next station.

Alternatively, assume the next slide to be fed into the aperture of the platen 16 to be a relatively thick slide 36K as shown in FIG. 5. AS the leading stripper portion 52 rides off the tapered ledge 76, the back portion of the actuator member rides over the edge of the slide which is being pushed forward by the rear edge of the platen. As the slide seated in the aperature moves forward, the slide on top would tend to move therewith due to friction caused by the weight of other slides in the stack. However, the edge of the slide on top engages with the rear actuator member so that the slide cannot move further. Continued movement of the platen causes the stripper to ride up and onto the top of the slide in the platen aperture. Following transport of the slide in the aperture to the next station, the former upper slide is lowered into the aperture of the platen.

For reverse slide transport, the stripper portions 52, 54 function oppositely to the sequence of movement above described.

In summary, a separator device is provided for separating intermixed thick and thin slides to be projected by a slide projector accepting vertically stacked from a supply cartridge. Many modifications and alterations of the described embodiment may be made without departing from the spirit and scope of the invention.

I claim:

1. Improvements in a slide projector having a slide entry station in a housing for receiving slides from a vertical stack of intermixed thick and thin slides, and having a platen having a plurality of apertures for accepting in each aperture a slide from the bottom of the stack at the entry station and transporting the slide in the aperture to another station, the improvement comprising:

tapered wedge surfaces on said platen at leading and trailing edges of said slide accepting aperture in said platen, said surfaces being inclined constantly from a thickness less than the thickness of said platen which thickness is less than the thickness of a thin slide to the thickness of said platen which thickness is slightly greater than the thickness of a thick slide; and a separator member fixed in said housing at said entry station, including:

stripper means arranged as leading and trailing members extending along the width of said aperture relative to said platen;

an arcuate inner surface on said stripper means having a depth for engaging said upper slide so as to preclude said upper slide from movement from said station as said lower slide in said platen is moved from alignment in said stack;

a tapered surface on the bottom of said stripper means angled from said inner surface and having an angle substantially complementary to the incline of said tapered wedge surface of said platen for engaging with said tapered wedge on said platen for lifting the trailing of said stripper means onto said platen as said platen moves; and yieldable arms biasing said stripper means toward said platen, and supporting said stripper means for yieldable movement away from said platen;

whereby an upper slide above a single lower slide accepted in the apparatus of said platen is prevented from moving relative to said entry station by said leading stripper means when said platen is moved to displace said lower slide in said aperture from said station, whether said slides are either thick or thin slides.

* * * * *